(12) United States Patent
Singhvi et al.

(10) Patent No.: US 11,190,458 B2
(45) Date of Patent: Nov. 30, 2021

(54) NETWORK FUNCTIONS SUPPORT FOR SERVERLESS AND GRANULAR COMPUTING ENVIRONMENTS

(71) Applicant: VMware, Inc., Palo Alto, CA (US)

(72) Inventors: Arjun Singhvi, Madison, WI (US); Sujata Banerjee, Palo Alto, CA (US); Mark Peek, Palo Alto, CA (US); Yotam Harchol, Berkeley, CA (US); Pontus Rydin, Mendham, NJ (US)

(73) Assignee: VMware, Inc., Palo Alto, CA (US)

( * ) Notice: Subject to any disclaimer, the term of this patent is extended or adjusted under 35 U.S.C. 154(b) by 157 days.

(21) Appl. No.: 15/814,237

(22) Filed: Nov. 15, 2017

(65) Prior Publication Data

US 2019/0149480 A1  May 16, 2019

(51) Int. Cl.
*H04L 12/911* (2013.01)
*H04L 12/851* (2013.01)
*G06F 9/50* (2006.01)

(52) U.S. Cl.
CPC ............. *H04L 47/78* (2013.01); *H04L 47/24* (2013.01); *H04L 47/2483* (2013.01); *G06F 9/5077* (2013.01)

(58) Field of Classification Search
CPC ..... H04L 47/78; H04L 47/24; H04L 47/2483; H04L 41/0806; H04L 41/145; G06F 9/455
See application file for complete search history.

(56) References Cited

U.S. PATENT DOCUMENTS 10,228,869 B1 * 3/2019 Nakibly ............... H04L 47/822
10,257,033 B2 * 4/2019 Shimamura ......... H04L 41/5045
10,355,934 B2 * 7/2019 Pinski ................. H04L 43/0888
2015/0365322 A1 * 12/2015 Shatzkamer ............ H04L 45/38 370/392
2016/0373349 A1 * 12/2016 Porat ....................... H04L 45/38
2016/0380884 A1 * 12/2016 Sarikaya ................ H04W 8/08 370/389

(Continued)

OTHER PUBLICATIONS

Data Plane Development Kit (DPDK), http://dpdk.org, 2 pages.

(Continued)

*Primary Examiner* — Dhairya A Patel
*Assistant Examiner* — Eui H Kim
(74) *Attorney, Agent, or Firm* — Patterson + Sheridan, LLP

(57) ABSTRACT

The disclosure provides an approach for enabling network functions to be executed in serverless computing environments. One embodiment employs a per-packet architecture, in which the trigger for launching a serverless computing instance is receipt of a packet. In such a case, each received packet is packaged into a request to invoke network function(s) required to process the packet, and a serverless computing environment in turn executes the requested network function(s) as serverless computing instance(s) that process the packet and return a response. Another embodiment employs a per-flow architecture in which the trigger for launching a serverless computing instance is receipt of a packet belonging to a new traffic flow. In such a case, a coordinator identifies (or receives notification of) a received packet that belongs to a new sub-flow and launches a serverless computing instance to process packets of the sub-flow that are redirected to the serverless computing instance.

16 Claims, 5 Drawing Sheets

(56) References Cited

U.S. PATENT DOCUMENTS

| | | | | |
|---|---|---|---|---|
| 2017/0085473 | A1* | 3/2017 | Zhu | H04L 45/64 |
| 2017/0222917 | A1* | 8/2017 | Reddy | H04L 45/24 |
| 2017/0273099 | A1* | 9/2017 | Zhang | H04W 72/1268 |
| 2018/0375712 | A1* | 12/2018 | Krohling | H04L 29/06578 |
| 2019/0089651 | A1* | 3/2019 | Pignataro | H04L 45/74 |

OTHER PUBLICATIONS

Iperf. Documentation, http://software.es.net/iperf/, 2 pages.
Anat Bremler-Barr et al., OpenBox: A Software-Defined Framework for Developing, Deploying, and Managing Network Functions, In Proceedings of the 2016 conference on ACM SIGCOMM 2016 Conference, pp. 511-524, ACM, 2016.
Sadjad Fouladi et al., Encoding, Fast and Slow: Low-Latency Video Processing Using Thousands of Tiny Threads, In 14th USENIX Symposium on Networked Systems Design and Implementation (NSDI 17), pp. 363-376, Boston, MA, 2017, USENIX Association.
Aaron Gember-Jacobson et al., OpenNF: Enabling Innovation in Network Function Control, In Proceedings of the 2014 ACM Conference on SIGCOMM, SIGCOMM '14, pp. 163-174, New York, NY, USA, 2014, ACM.
Jinho Hwang et al., NetVM: High Performance and Flexible Networking using Virtualization on Commodity Platforms, In 11th USENIX Symposium on Networked Systems Design and Implementation (NSDI 14), pp. 445-458, Seattle WA, 2014, USENIX Association.
Eric Jonas et al., Occupy the Cloud: Distributed Computing for the 99%, Jun. 2017, 15 pages.
Murab Kablan et al., Stateless Network Functions: Breaking the Tight Coupling of State Processing, In 14th USENIX Symposium on Networked Systems Design and Implementation (NSDI 17), pp. 97-112, Boston, MA, 2017, USENIX Association.
Aurojit Panda et al., NetBricks: Taking the V out of NFV, In 12th USENIX Symposium on Operating Systems Design and implementation (OSDI 16), pp. 203-216, GA, 2016, USENIX Association.
Aurojit Panda et al., Verifying Reachability in Networks with Mutable Datapaths, In 14th USENIX Symposium on Networked Systems Design and Implementation (NSDI 17), pp. 699-718, Boston, MA, 2017, USENIX Association.
Vern Paxson, Bro: A System for Detecting Networking Intruders in Real-Time, Computer Networks, pp. 1-22, 1999.
Martin Roesch, Snort—Lightweight Intrusion Detection for Networks, Proceedings of LISA '99: 13th Systems Administration Conference, pp. 229-238, Seattle, WA, 1999.
Brendan Tschaen et al., SFC-Checker: Checking the Correct Forwarding Behavior of Service Function Chaining, In Network Function Virtualization and Software Defined Networks (NFV-SDN), IEEE Conference, pp. 134-140, IEEE, 2016.
Wei Zhang et al., Flurries: Countless Fine-Grained NFs for Flexible Per-Flow Customization, In Proceedings of the 12th International on Conference on Emerging Networking Experiments and Technologies, CoNEXT '16, pp. 3-17, New York, NY, USA, 2016, ACM.
Eddie Kohler et al., The Click Modular Router, ACM Transactions on Computer Systems, pp. 263-297, 2000.
AWS Lambda, https://aws.amazon.com/lambda.
Azure Functions, https://functions.azure.com.
Berkeley Extensible Software Switch (BESS), http://span.cs.berkeley.edu/bess.html.
Google Cloud Functions, https://cloud.google.com/functions.
IBM Bluemix Openwhisk, https://www.ibm.com/cloud-computing/bluemix/openwhisk.
IronFunctions, https://github.com/iron-io/functions.
Network Functions Virtualisation—Introductory White Paper, https://portal.etsi.org/NFV/NFV_White_Paper.pdf.
OpenLambda, https://open-lambda.org.

* cited by examiner

NETWORK FUNCTIONS SUPPORT FOR SERVERLESS AND GRANULAR COMPUTING ENVIRONMENTS

BACKGROUND

A network function provides the functionality of transforming, inspecting, filtering, or otherwise examining or manipulating traffic for purposes other than ordinary packet forwarding of a router. Typically, network functions lie in the critical path between source and destination and help ensure security, improve performance, or provide other network-related functionality. Network functions also typically need to be capable of handling packet bursts and failures. Examples of network functions include firewalls and similar security systems, packet counters, load balancers, network address translation (NAT), network optimizers (such as wide area network optimizers), protocol accelerators, intrusion detection systems, intrusion prevention systems, and proxy/caches. Recently, network function virtualization, in which network functions that were traditionally implemented with proprietary hardware and specialized software are decoupled from the proprietary hardware and run as software in virtual machines (VM) deployed on commodity servers, has become popular.

Serverless computing, also sometimes referred to as "functions-as-a-service (FaaS)," provides computing in short-lived, stateless, small chunks with highly flexible scaling and typically a pay-for-what-you-use price structure. In contrast to VMs and physical servers, users of serverless computing services no longer need to provision/manage VMs or physical servers, and can instead build applications as a set of functions that run in the serverless computing environment. Resource provisioning and scaling are then handled by, e.g., a cloud provider of the serverless computing environment. Amazon Web Services (AWS) Lambda is one of a number of commercially available serverless computing services.

Running network functions in serverless computing environments is particularly challenging, as network functions tend to be long lived, stateful, require high packet throughput, and have additional requirements such as chaining of functions. These properties of network functions are at odds with the short-lived, stateless, and small chunk computing, as well as the limited supported for chaining functions, provided by traditional serverless computing.

SUMMARY

One or more embodiments provide a method of processing a network packet. The method generally includes receiving the network packet, and executing one or more serverless computing instances that each performs one or more packet processing functions. The one or more serverless computing instances are executed either on a per-packet basis to process the received network packet or on a per-flow basis to process a traffic flow to which the received network packet belongs. In addition, the method includes sending the processed network packet to a destination.

Further embodiments include one or more non-transitory computer-readable storage media storing instructions that, when executed by a computing system cause the computer system to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein provide techniques for enabling network functions to be executed in serverless computing environments. Serverless computing instances running network functions may be spawned at two different levels of granularity. As used herein, "serverless computing instance" refers to an instance of a function executing in a serverless computing environment, e.g., in a container or other virtual computing instance in the serverless computing environment. One embodiment employs a per-packet architecture, in which the trigger for launching a serverless computing instance is receipt of a packet. In such a case, each received packet is packaged into a request to invoke network function(s) required to process the packet, and the serverless computing environment in turn executes the requested network function(s) as serverless computing instance(s) to perform the processing and returns a response. A chain of serverless computing instances may also be defined in advanced, and a received packet processed by, e.g., "stepping" through the predefined chain of serverless computing instances. Such a chain of serverless computing instances may generally include a pre-defined workflow of tasks performed by serverless computing instances that execute sequentially and/or in parallel. Another embodiment employs a per-flow architecture in which a coordinator identifies a received packet as belonging to a new sub-flow based on, e.g., a tuple of packet fields, and launches a serverless computing instance to process packets of the sub-flow that then are redirected to the serverless computing instance.

For simplicity, the term "packet" is used herein to generally refer to data packets and data frames. A frame is similar to a packet, except a frame typically refers to Layer 2 data (e.g., so-called Ethernet Frames or Medium Access Control (MAC) Frames) and typically includes both a header and a trailer, whereas a Layer 3 packet (e.g., an Internet Protocol (IP) packet) does not include a trailer.

Figure 1:
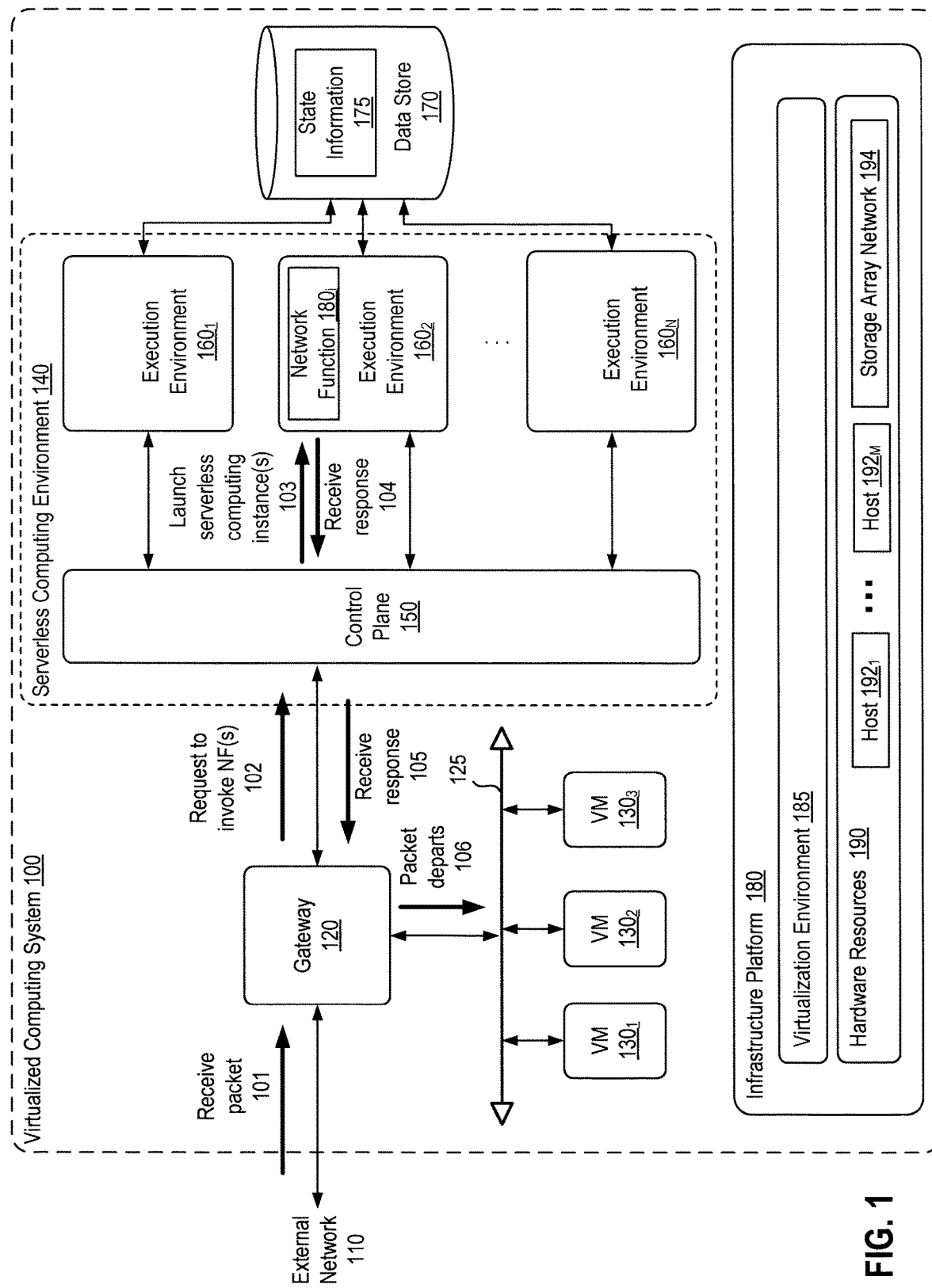
FIG. 1 depicts a block diagram of a virtualized computing system in which one embodiment of the present disclosure may be utilized.

FIG. 1 depicts a block diagram of a virtualized computing system 100 in which one embodiment of the present disclosure may be utilized. Virtualized computing system 100 implements a packet-based architecture in which packets are the basic unit of request to a serverless computing service.

In such a packet-based architecture, each incoming packet is packaged into a request to invoke network function(s). The request including the packet is then submitted to a serverless computing environment and processed therein by one or more serverless computing instance(s). In addition, chaining mechanisms provided by the serverless computing environment may be directly used to process a packet through a chain of serverless computing instances that execute sequentially, and/or some of the serverless computing instances may execute in parallel, as set up a priori.

As shown, virtualized computing system 100 includes an infrastructure platform 180 upon which a gateway 120, virtual machines (VMs) $130_1$ to $130_3$, and a serverless computing environment 140 are executed. Virtualized computing system 100 may be an on-premise data center or a cloud data center. On-premise data centers are typically controlled and administrated by a particular enterprise or business organization, while cloud data centers are typically operated by a cloud computing service provider and exposed as a service available to account holders, such as a particular enterprise in addition to other enterprises and/or individuals. On-premise data centers and cloud data centers are sometimes referred to as "private" clouds and "public" clouds, respectively.

Infrastructure platform 180 includes hardware resources 190 including computing resources (e.g., hosts $192_1$ to $192_N$), storage resources (e.g., one or more storage array systems, such as SAN 194), and networking resources, which are configured in a manner to provide a virtualization environment that supports the execution of a plurality of virtual machines 130 across host computers 192. Hosts 192 may be constructed on server grade hardware platforms, such as x86 architecture platforms, that each include conventional components of a computing device, such as one or more processors (CPUs), system memory, a network interface, storage system, and other I/O devices such as, for example, a mouse and keyboard. In some embodiments, hardware resources 190 of virtualized computing system 100 may in fact be distributed across multiple data centers in different locations.

VMs 130 represent virtual systems—each having its own virtual processors, virtual memory, virtual networking interface, virtual disk storage, and BIOS. Although three VMs 130 are shown for illustrative purposes, any number of VMs may generally execute in a virtualized computing system. Further, although VMs are sometimes used herein as a reference example of virtual computing instances, it should be understood that other types of virtual computing instances, such as containers, may be used in lieu of VMs. VMs 130 run in hosts 192 that each executes virtualization software, also referred to as a "hypervisor," capable of creating and managing multiple virtual machines on the host computer. In particular, the virtualization software running in each host $192_i$ performs system resource management and VM resource emulation. VM resource emulation may be performed by a virtual machine monitor (VMM) component, and in some implementations, each VM may have a corresponding VMM instance. Depending on implementation, the virtualization software may be unhosted or hosted. Unhosted virtualization software generally relies on a specialized virtualization kernel for managing system resources, whereas hosted virtualization software relies on a commodity operating system—the "hosting operating system"—such as Windows, Mac OS X, or Linux to manage system resources. In a particular embodiment, the virtualization software may be a VMware ESXi™ hypervisor provided as part of the VMware vSphere® solution made commercially available from VMware, Inc. of Palo Alto, Calif. In one embodiment, virtualized data center 100 may further include a virtualization manager (not shown) that is a computer program residing and executing in a central server, or alternatively, running in a VM, and is responsible for carry out administrative tasks for virtualized system 100, including managing hosts 192, managing VMs running within each host $192_i$, provisioning VMs, migrating VMs from one host $192_i$, to another, and load balancing between hosts 192. One example of a virtualization manager is the vCenter Server™ product made available from VMware, Inc.

Serverless computing environment 140 includes a control plane 150 (also referred to as a "serverless computing platform") in communication with multiple execution environments $160_1$ to $160_N$. Execution environments $160_1$ to $160_N$ may be VMs, lightweight containers, containers running in VMs, or any other suitable virtual computing instance or physical system in which functions can run. As described, serverless computing environments such as serverless computing environment 140 permit users to package their applications as stateless functions that are housed in small short-lived compute units (e.g., containers) and dynamically scale functions based on user-provided events. For example, a user may upload a function to control plane 150 (which may then store the function in a data store) and further register with control plane 150 events such as receipt of a http request that triggers the function to execute. In turn, control plane 150 listens for the registered events and, when a trigger such as an http request is received, control plane 150 launches an appropriate serverless computing instance in one of execution environments 160. The serverless computing instance may be launched in a container that is already running or, if no compatible container is running, a container may also be launched that runs the serverless computing instance. Although described herein with respect to launching serverless computing instance(s), it should be understood that the serverless computing environment may re-use serverless computing instance(s) rather than launching new serverless computing instance(s) if the needed serverless computing instance(s) are already running. That is, "launching" as used herein may refer to the launch of a new serverless computing instance or re-use of an already running serverless computing instance(s), as appropriate.

Virtual data center 100 further includes one or more virtual networks 125 used to communicate between VMs 130 and managed by at least one networking gateway component, shown as gateway 120. Gateway 120 is configured to provide VMs 130 and other components in cloud computing environment 100 with connectivity to an external network 110 (e.g., Internet). Gateway 120 may be part of a programmable switch or router and may execute as, e.g., a virtual appliance (i.e., a pre-configured virtual machine VM with appliance(s) installed therein). Gateway 120 manages external public IP addresses for VMs 120 and routes traffic incoming to and outgoing from on-premise datacenter 102 and may itself provide some networking services, such as a firewall, network address translation (NAT), load balancing, dynamic host configuration protocol (DHCP), and virtual private network (VPN) connectivity over a network 110 (each of which may alternatively be executed using serverless computing instance(s), as discussed below).

As shown, in the packet-based architecture of FIG. 1, gateway 120 is configured to encapsulate a packet received from external network 110 at 101 into a request to execute network function(s), and to transmit such a request to serverless computing environment 140 at 102. In one embodiment, the packet may be encapsulated into a http or other request structure that serverless computing environment 140 accepts. For example, AWS Lambda exposes an http application programming interface (API) that permits applications to launch Lambda instances by making http requests to the API. Further, the request that is created specifies certain information, including the network function to execute or a predefined chain of network functions to execute. As described, a chain of network function may include a pre-defined workflow of packet processing tasks, which may each be a network function (or sub-function), that are performed by multiple serverless computing instances that execute sequentially and/or in parallel. For example, AWS Lambda provides a "step functions" service that allows a state machine to be defined that invokes Lambda serverless computing functions when certain states are reached. In such a case, gateway 120 may generate a request that specifies such a predefined state machine and then transmit the request to serverless computing environment 140.

At 103, in response to receiving the request from gateway 120, control plane 150 of serverless computing environment 140 launches (or re-uses) serverless computing instance(s) to execute the requested network function(s) (e.g., network function $180_i$) in execution environment(s) 160. Although the executing of network functions as serverless computing instances is described herein for ease of understanding, it should be understood that, in some embodiments, network functions may be decomposed into sub-functions/microservices that run as serverless computing instances. That is, each serverless computing instance may generally run either a whole network function or a sub-function/module of a network function, and "network function" as used herein is refers to either a whole network functions or a network sub-function/module. For example, a firewall network function may be decomposed into the following sub-functions/modules: a packet reader that reads a packet; one or more filters that each checks the network header, transport header, and/or the application header of the header of the packet; an alert module that generates alert(s) based on the filter results; a drop module that drops the packet based on the filter results if filtering rules require the packet to be dropped; and an output module. As another example, an intrusion prevention system may include a packet reader; one or more filters that each checks the network header, transport header, and/or the application header of the header of a packet; one or more deep packet inspection modules that execute in parallel to inspect the data part of the packet (and possibly the header); an alert module; a drop module; and an output module. Decomposing network functions into sub-functions can be advantageous, as different sub-function may have different resources requirements, scale differently, and be run in parallel. In addition, the application traffic flow-space may be partitioned into sub-flows that each traverse its own network function chain to, e.g., increase parallelization and not exceed the bandwidth capacity of a serverless computing instance. The launched (or re-used existing) serverless computing instance(s) then process the packet and return a response to control plane 150 at 104, which in turn returns the response to gateway 120. The particular processing that is performed and response returned will generally depend on the network function(s) that are executed. Continuing the firewall example from the above, a firewall or intrusion prevention system may, e.g., process the packet and return a response indicating that the packet should be permitted or dropped and/or an alert. Another example may be an intrusion detection function that redirects control plane 150 to send a suspicious packet (and all subsequent packets from the same source) to a different server for further processing. In one embodiment, the response may include the processed packet that is encapsulated in an http or other message, as well as other information such as the information on whether the packet should be dropped or alert described above. If the request from gateway 120 specifies a predefined chain of network functions, then those network functions may be executed sequentially and/or some of the network functions may be executed in parallel to process the packet.

In addition, if state information is needed for processing of the packet by any of the network function(s), then each network function serverless computing instance may first query data store 170 for the requisite state information (e.g., state information 175) and then use such information in processing the packet. As described, serverless computing instances are typically stateless, while many network functions are stateful and need to maintain per-packet, per-flow, and/or cross-flow states. In one embodiment, such information that needs to be maintained for a packet or flow is stored in an external data store such as data store 170. In another embodiment, network function serverless computing instances may be pre-loaded at launch time with the necessary state information so those network functions can process any packet from any flow, and in such a case data store 170 need not to be queried. However, if the state information is loaded only when some packets from some flow arrives at a serverless computing instance, then the network function serverless computing instances may query data store 170 when, for example, packets belonging to the same flow are being handled by two different serverless computing instances that each need state information to process (e.g., authenticate) the packets of that flow. As another example, some network functions may also utilize cross-flow state information to, e.g., help manage multiple flows together, and such cross-flow state information may also be stored in and queried from data store 170. Data store 170 may include any feasible storage, such as a low latency key-value storage service, database service, or the like. In one embodiment, network functions may be programmed to inspect each packet and identify a tuple of packet fields (e.g., a tuple including the source IP address, destination IP address, and port numbers of the packet) or compute a hash of such a tuple to use as a key in querying state information associated with the traffic sub-flow to which the packet belongs. In another embodiment, the request sent from gateway 120 to execute the serverless computing instance may include an identifier (ID) of (or another way of identifying) the flow, which the serverless computing instance may then use to query the flow state information. It should be understood that, in the per-packet architecture, packets are "sprayed" across serverless computing instances, as packets belonging to a flow may be processed by different serverless computing instances. As a result, each serverless computing instance hosting a network function needs access to all pertinent state information for flows. Particular flow state information that is retrieved through querying may subsequently be stored in any suitable cacheable state in local memory of the serverless computing instance.

Assuming the packet is not being dropped, then subsequent to receiving the response from serverless computing environment 140, gateway 120 decapsulates the response to extract the payload which is the processed packet and sends the processed packet to a destination at 106, which as shown is one of VMs 130.

Figure 2:
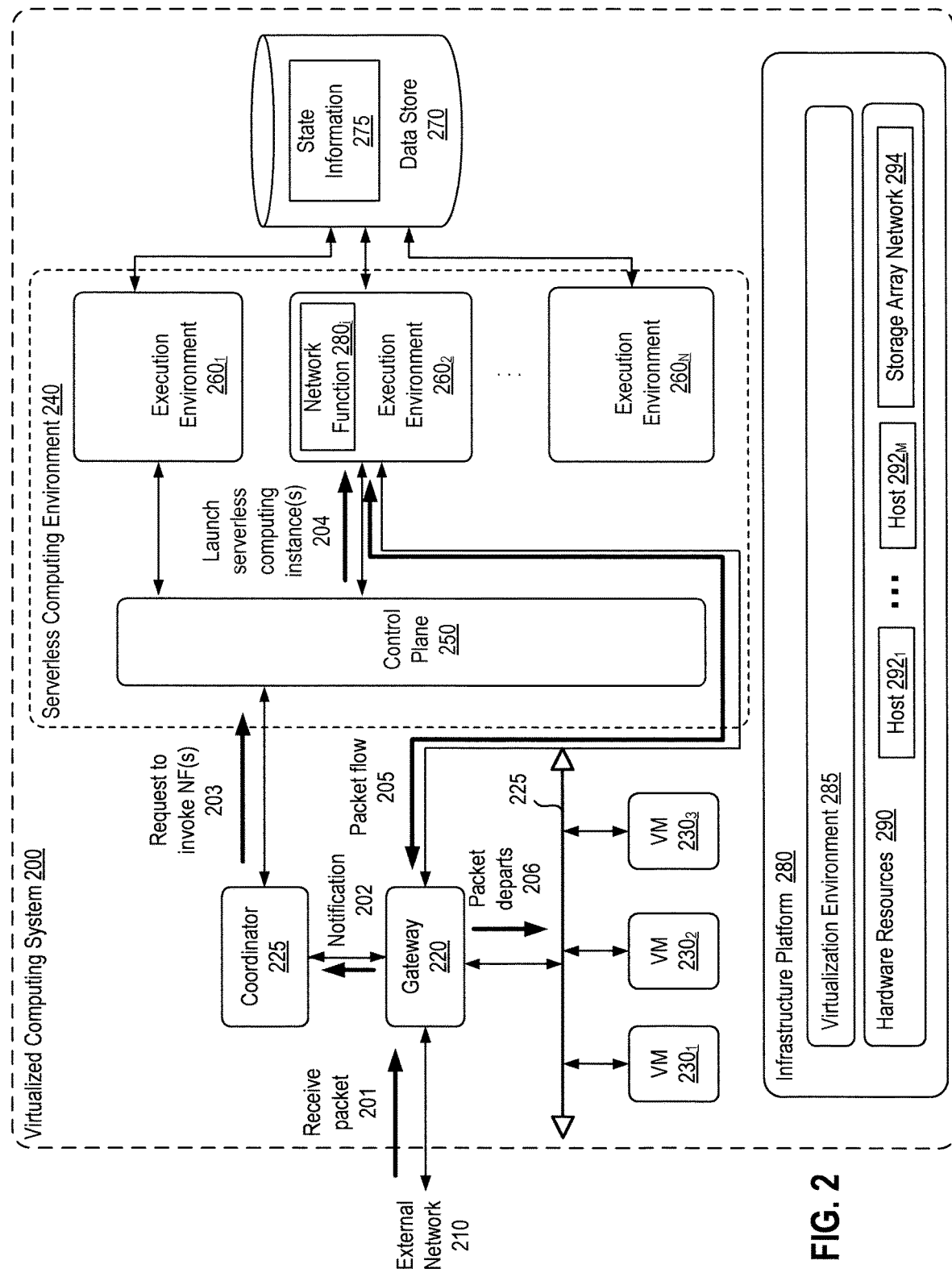
FIG. 2 depicts a block diagram of a virtualized computing system in which an alternative embodiment of the present disclosure may be utilized.

FIG. 2 depicts a block diagram of a virtualized computing system 200 in which an alternative embodiment of the present disclosure may be utilized. Virtualized computing system 200 implements a flow-based architecture in which each sub-flow of the application traffic flow-space is assigned to a distinct serverless computing instance, with all packets belonging to a sub-flow being processed by the assigned serverless computing instance. The flow-based architecture eliminates the per-packet architecture's overhead of packaging and processing requests to execute serverless computing instances for each packet, but requires an additional coordinator component to coordinate the flow-to-serverless computing instance mapping as well as additional bootstrapping, as discussed in greater detail below.

As shown, virtualized computing system 200 includes an infrastructure platform 280 upon which a gateway 220, VMs $230_{1-3}$, a coordinator 235, and a serverless computing environment 240 are executed. Infrastructure platform 280, gateway 220, VMs 230, and data store 270 are similar to corresponding components infrastructure platform 180, gateway 120, VMs 130, and data store 170 in virtualized computing system 100 described above with respect to FIG. 1, and descriptions of identical functionalities of these components are omitted for brevity.

Illustratively, coordinator 235 is a component running alongside serverless computing environment 140 and is responsible for assigning network functions/modules and sub-flows to serverless computing instances. Similar to gateway 220, coordinator 235 may be implemented as a virtual appliance in one embodiment. At 201, gateway 220 receives a packet from external network 210, and in turn gateway 220 notifies coordinator 225 when a new sub-flows is detected. A sub-flow may be identified in any suitable manner, such as based on a tuple of predefined fields of the received packet (e.g., a tuple including the source IP address, destination IP address, and port numbers of the packet).

Upon receiving notification of a new sub-flow (or itself identifying a new sub-flow), coordinator 225 requests the execution of serverless computing instance(s) for network function(s) needed to process the new sub-flow at 203. In one embodiment, the request may include configuration information to process the network functions (e.g., a flow ID, firewall rules to process the sub-flow, etc.), network function chain information (e.g., chain IDs), and bootstrapping information for the serverless computing instance to communicate with the sub-flow endpoint. The bootstrapping information in particular allows the serverless computing instance to maintain a (e.g., socket) connection with gateway 220, and gateway 220 then sends (e.g., using tunneling) packets belonging to particular sub-flows to the appropriate connections identified by, e.g., their IP addresses as relayed by the serverless computing instance to coordinator 225 and then provided by coordinator 225 to gateway 220. As a result, at 205, packets belonging to the particular sub-flow directly traverse the network function chain in serverless computing environment 240 to receive the appropriate processing, without involving coordinator 225 or control plane 250 of serverless computing environment 240 again. Responses may also be transmitted directly back to gateway 220, which at 206 decapsulates such responses to extract their payloads which are the processed packets and sends the processed packets to destinations, which as shown are VMs 230.

In addition to launching (or re-using) serverless computing instance(s) for each sub-flow, coordinator 225 may also keep track of usage of the serverless computing instance(s) and make resource decisions during flow processing. Serverless computing instance(s) typically have limited life spans. For example, AWS restricts Lambda instances to 5 minutes.

In one embodiment, if a sub-flow duration is longer than the lifetime of serverless computing instance(s) that have been launched to process packets of the sub-flow, then coordinator 225 proactively launches new serverless computing instance(s) so that processing of the sub-flow can be migrated to the new serverless computing instance(s) as needed (e.g., when the lifetimes of the old serverless computing instance(s) expire). For example, executing serverless computing instance(s) may notify coordinator 225 when their lifetimes are about to expire (e.g., within some threshold time of expiring), and coordinator 225 may launch replacement serverless computing instance(s) in response to such notifications.

Coordinator 225 may further assist in maintaining flow state information and cross-flow state information. Similar to the discussion above with respect to the per-packet architecture of virtualized computing system 100, flow state information (e.g., state information 275) is stored in, and may be retrieved from, data store 270. For example, the request sent from gateway 120 to execute the serverless computing instance may include an ID of, or another way of identifying, the sub-flow that the packet belong to, and the serverless computing instance that is executed may use such an ID to query for the requisite flow state information associated with the sub-flow. In another embodiment, the network functions themselves may be programmed to inspect a packet and identify a tuple of packet fields (e.g., a tuple including the source IP address, destination IP address, and port numbers of the packet) or compute a hash of such a tuple to use as a key in querying state information associated with the sub-flow.

Although gateway 220 and coordinator 225 in FIG. 2 and gateway 120 in FIG. 1 are shown as distinct from serverless computing environment 240 and serverless computing environment 140, respectively, it should be understood that, in alternative embodiments, gateways 120 and 220 and/or coordinator 225 may instead be implemented as part of a serverless computing environment. Although shown in FIGS. 1 and 2 and described herein primarily as separate architectures, it should be understood that the per-packet and per-flow architectures disclosed herein may be combined in some embodiments. For example, the per-packet approach requires making many requests to execute serverless computing instances, which as described introduces overhead and can also result in re-ordering of the packets (i.e., the packets going into serverless computing environment 140 first may not be the first to come out) and additionally be expensive when implemented in a public cloud that charges a fixed fee per request. On the other hand, the per-flow approach is not parallelizable in the way the per-packet approach is and does not make use of the native auto-scaling (as opposed to scaling by coordinator 225 based on new flows) or chaining mechanisms provided by serverless computing environments. As a result, to take advantage of the parallelization of the per-packet approach while avoiding its drawbacks, in one embodiment the per-packet architecture may be implemented on a private cloud side of a hybrid cloud system, while the per-flow architecture may be implemented on the public cloud side of the hybrid cloud. A hybrid cloud is a computing system that stretches between private and public clouds and permits workloads (e.g., VMs) to be migrated between the private and public clouds, among other things. In another embodiment, the per-packet and per-flow approaches may be employed together, with coordinator 225 and/or gateway 220 selecting which to use for a particular packet based on, e.g., whether the network functions that are required to process the packet are parallelizable (in which case the per-packet approach may be chosen) or the like. For example, certain stateless firewalls are parallelizable and may benefit from the per-packet approach. Further, although described herein primarily with respect to transmitting packets to a serverless computing environment for processing, it should be understood that, in alternative embodiments, packet contents may instead be stored in a data store (e.g., an auxiliary storage service) and referenced from such a data store, rather than pushing the packet data through the serverless computing environment.

Figure 3:
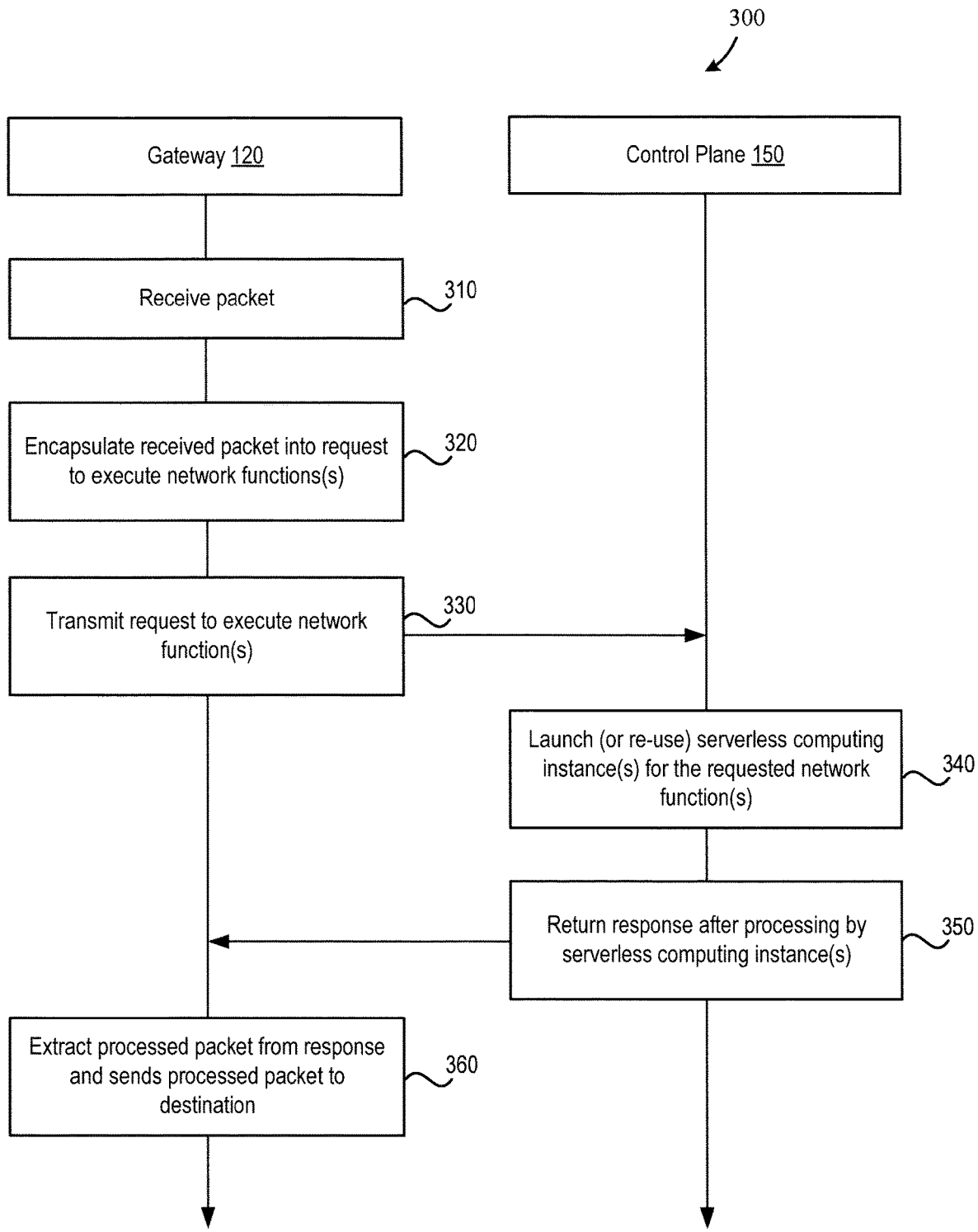
FIG. 3 depicts a flow diagram of a method of executing network functions as serverless computing instances, according to an embodiment.

FIG. 3 depicts a flow diagram of a method 300 of executing network functions as serverless computing instances, according to an embodiment. In one embodiment, method 300 may be employed with the per-packet architecture described above with respect to FIG. 1. As shown, method 300 begins at step 310, where gateway 120 receives a packet. Gateway 120 may receive the packet from, e.g., external network 110 or elsewhere.

At step 320, gateway 120 encapsulates the received packet into a request to execute network function(s). As described, the packet may be encapsulated as a payload of a http or other request structure (e.g., a request API structure) that serverless computing environment 140 accepts, and the request may specify the network function or a predefined chain of network functions to execute on the packet, among other things.

At step 330, gateway 120 transmits the request to execute the network function(s) to serverless computing environment 140. In response to receiving such a request, control plane 150 of serverless computing environment 140 launches (or re-uses existing) serverless computing instance(s) for the requested network function(s) at step 340. The launched (or existing) serverless computing instance(s) then process the packet, and, at step 340, control plane 150 returns a response of such processing to gateway 120. As described, processing the packet may include executing a predefined chain of network functions sequentially and/or in parallel. That is, an in-network computation is performed in which packets flow through a set of one or more network functions that execute as serverless computing instances, rather than traditional physical or virtual appliances, and the result of such processing is returned back to gateway 120.

At step 350, gateway 120 extracts (e.g., by decapsulation) the processed packet from the response received from control plane 150 and sends the processed packet to a destination (or drops the packet, as appropriate). For example, gateway 120 may forward the processed packet to a next-hop destination (inside or outside virtualized computing system 100) or to one of VMs 130.

Figure 4:
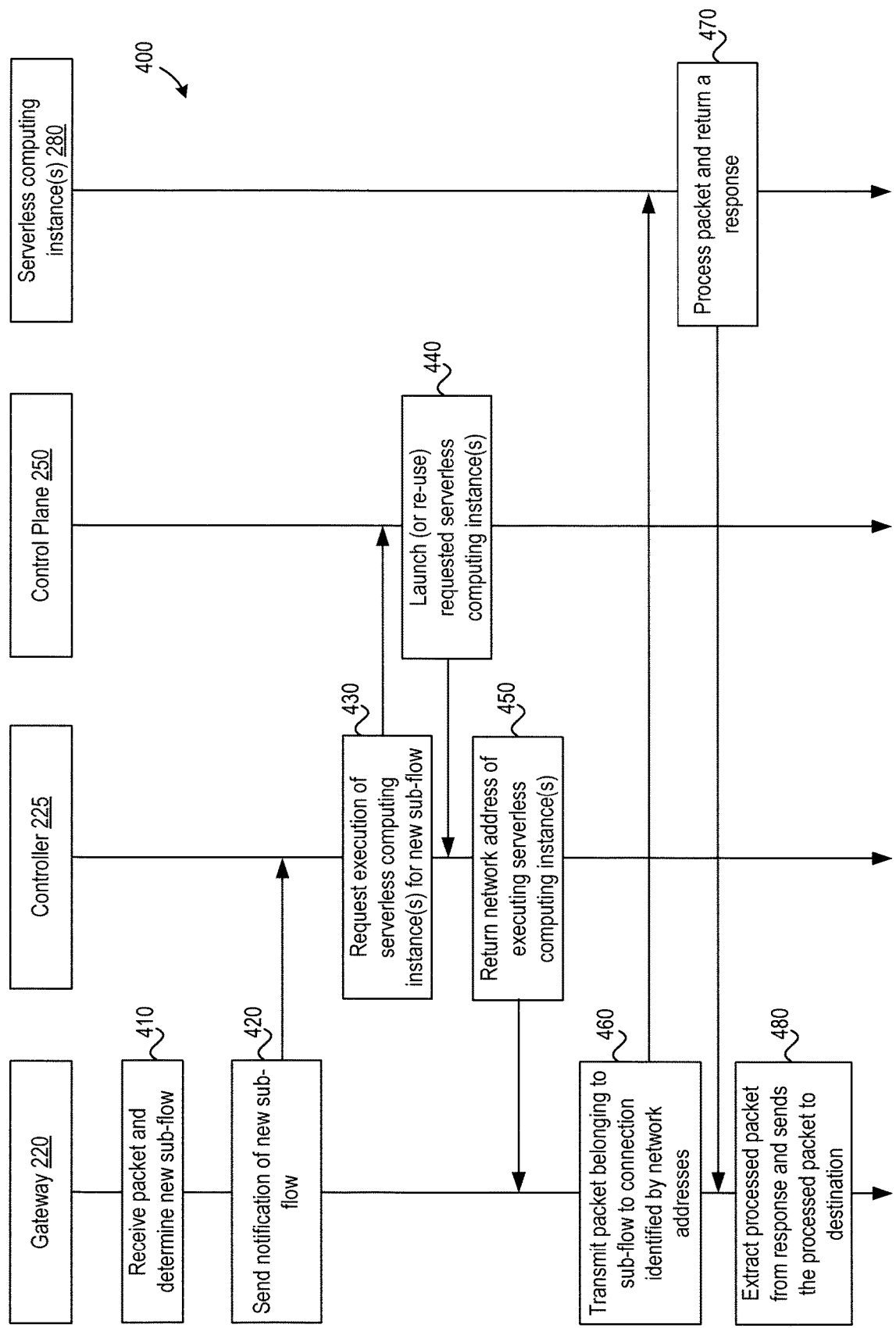
FIG. 4 depicts a flow diagram of a method of executing network functions as serverless computing instances, according to an alternative embodiment.

FIG. 4 depicts a flow diagram of a method 400 of executing network functions as serverless computing instances, according to an alternative embodiment. In one embodiment, method 400 may be employed with the per-flow architecture described above with respect to FIG. 2. As shown, method 400 begins at step 410, where gateway 220 receives a packet from external network 210 that gateway 220 determines belongs to a new sub-flow. As described, a new sub-flow may be identified in any suitable manner, such as comparing a tuple of predefined fields of the received packet or a hash of such a tuple to the tuples/hashes of other sub-flows.

At step 420, gateway 220 notifies coordinator 225 of the new sub-flow. Alternatively, gateway 220 may notify coordinator 225 of the received packet, and coordinator 225 may itself determine that the packet belongs to a new sub-flow.

In response to the notification at step 420 (or itself determining that a received packet belongs to a new sub-flow), coordinator 225 requests that control plane 250 of serverless computing environment 240 execute a new serverless computing instance(s) for network function(s) needed to process the new sub-flow at step 430. The request to execute serverless computing instance(s) may include configuration information to process the network function(s), network function chain information, and bootstrapping information discussed in greater detail below that permits the serverless computing instance(s) to maintain connections with gateway 220, which gateway 220 may use to send (e.g., using tunneling) packets belonging to particular sub-flows directly to the appropriate connections for processing and receive responses thereto. As described, the request may in one embodiment include an ID of (or another way of identifying) the sub-flow, and the serverless computing instance may use such an ID to query appropriate flow state information from data store 270 prior to processing packets belonging to the sub-flow.

At step 440, control plane launches the requested serverless computing instance(s) (or re-uses existing serverless computing instance(s) if appropriate). Coordinator 225 may further track the usage of the serverless computing instance(s) to, e.g., proactively launch new serverless computing instance(s) to which the processing of the sub-flow is migrated (along with configurations and any stored state information) when the lifetimes of currently executing serverless computing instance(s) expire.

At step 450, coordinator 225 returns a network address (e.g., an IP address) of the serverless computing instance(s) to gateway 220. In one embodiment, when a serverless computing instance is launched with a function to be executed (or re-used), the first task of the function may be to relay the IP address of the serverless computing instance to coordinator 225. In such a case, the coordinator's 225 IP address is known beforehand and specified, in the bootstrapping information described above, as the destination to relay the IP address of the serverless computing instance to.

Then, at step 460, gateway 220 transmits (e.g., using tunneling) a packet belonging to the particular sub-flow to the connection identified by the network addresses as provided by coordinator 225. As described, packets belonging to the particular sub-flow may be directly sent to the network function chain in serverless computing environment 240 without involving coordinator 225 or control plane 250 of serverless computing environment 240 again.

At step 470, the network function chain (e.g., including network function 280) processes the packet, with the packet being processed sequentially and/or in parallel through network (sub)function according to the pre-defined chain, and returns a response which includes the processed packet to gateway 220. In turn, gateway 220 extracts (e.g., by decapsulation) the processed packet from the response received from the network function chain at step 480 and sends the processed packet to a destination, such as to a next-hop destination (inside or outside virtualized computing system 200) or to one of VMs 230 (or drops the packet, as appropriate).

Figure 5:
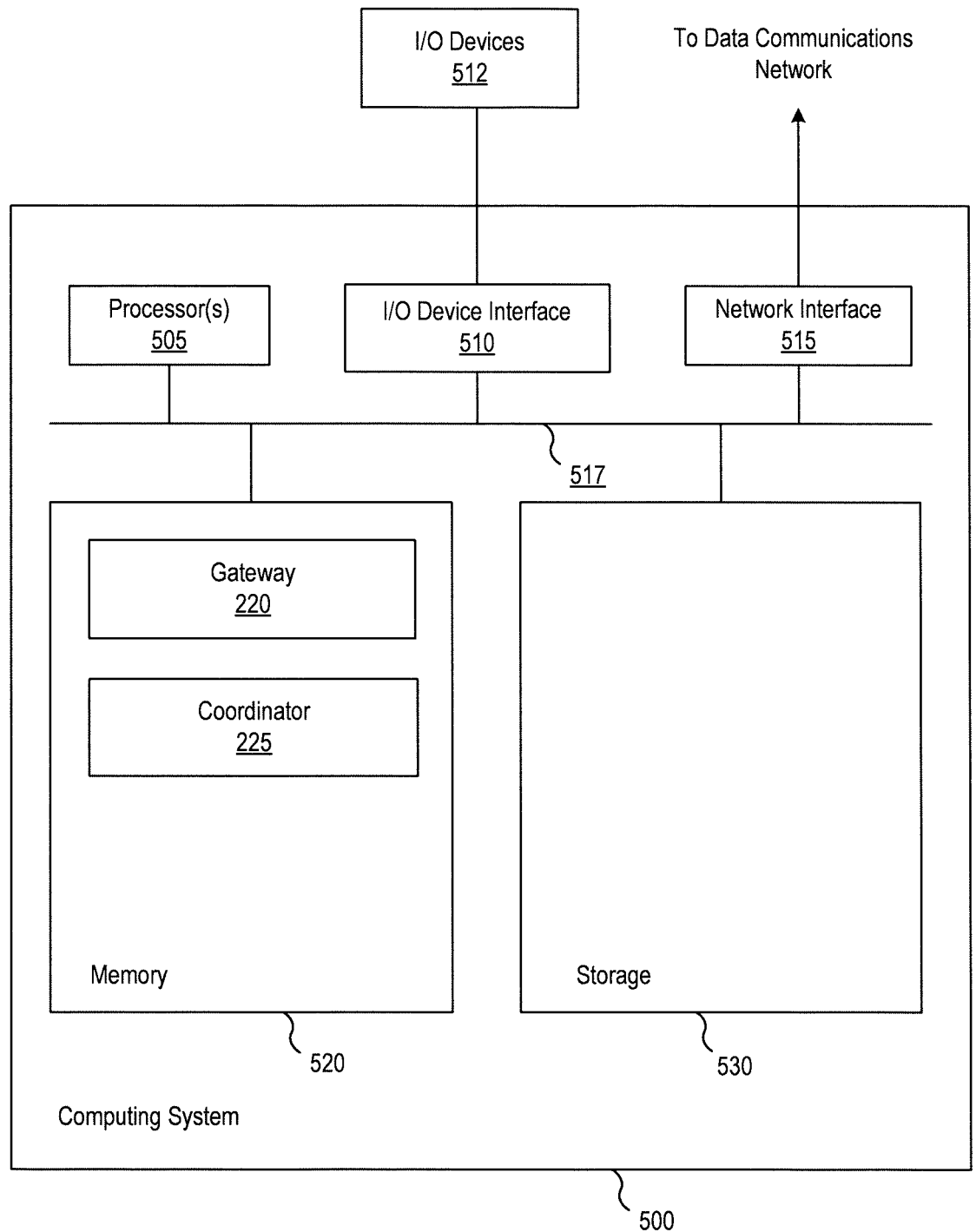
FIG. 5 depicts a block diagram of a computer system in which components of some embodiments may be implemented.

FIG. 5 depicts a block diagram of a computer system 500 in which components of some embodiments may be implemented. Computer system(s) such as computer system 500 may generally be used to execute any of the virtualization, serverless computing, and/or other functionalities described above. As shown, system 500 includes, without limitation, processor(s) 505, a network interface 515 connecting the system to a network, an interconnect 517, a memory 520, and storage 530. System 500 may also include an I/O device interface 510 connecting I/O devices 512 (e.g., keyboard, display and mouse devices) to system 500.

Processor(s) 505 generally retrieve and execute programming instructions stored in the memory 520. Similarly, processor(s) 505 may store and retrieve application data residing in the memory 520. Interconnect 517 facilitates transmission, such as of programming instructions and application data, between processor(s) 505, I/O device interface 510, storage 530, network interface 515, and memory 520. Processor(s) 505 are included to be representative of general purpose processor(s) and optional special purpose processors for processing video data, audio data, or other types of data. For example, processor(s) 505 may include a single central processing unit (CPU), multiple CPUs, a single CPU having multiple processing cores, one or more graphical processing units (GPUS), one or more FPGA cards, or a combination of these. And memory 520 is generally included to be representative of a random access memory. Storage 530 may be a disk drive storage device. Although shown as a single unit, storage 530 may be a combination of fixed or removable storage devices, such as magnetic disk drives, flash drives, removable memory cards or optical storage, network attached storage (NAS), or a storage area-network (SAN). Further, system 500 is included to be representative of a physical computing system as well as VM instance(s) hosted on a set of underlying physical computing systems. Further still, although shown as a single computing system, one of ordinary skill in the art will recognized that components of the system 500 shown in FIG. 5 may be distributed across multiple computing systems connected by a data communications network.

Illustratively, memory 520 includes gateway 220 and coordinator 225. As described, gateway 220 and coordinator 225 may be applications running inside one or more VMs in one embodiment. For example, system 500 may itself be such a VM, or system 500 may be a host computer (e.g., one of hosts 292) in which VM(s) including gateway 220 and coordinator 225 execute. In one embodiment implementing the per-flow architecture described above, gateway 220 identifies and notifies coordinator 225 of a new sub-flow, coordinator 225 in turn requests the execution of serverless computing instance(s) for network function(s) needed to process the new sub-flow, coordinator 225 returns a network address of the serverless computing instance(s) to gateway 220, gateway 220 transmits a packet belonging to the particular sub-flow to a connection identified by the network address, and gateway 220 then extracts a processed packet from a response received from the network function(s) and sends the processed packet to a destination (or drops the packet), according to method 400 discussed above with respect to FIG. 4. In an alternative embodiment implementing the per-packet architecture described above, coordinator 225 may be omitted and gateway 120 included in memory 520 may receive a packet, encapsulate the received packet into a request to execute network function(s), transmit the request to a serverless computing environment, extract a processed packet from a response received from the serverless computing environment, and send the processed packet to a destination (or drops the packet), according to method 300 discussed above with respect to FIG.

Advantageously, embodiments presented herein provide techniques that enable network functions to be executed in serverless computing environments. Doing so may bring the benefits of serverless computing environments, such as auto-scalability based on load and large-scale parallel processing, to network functions, as well as encourage developers to design network functions as micro-services. That is, network functions executing in serverless computing environments may help provide a dynamic, auto-scaling microservice based architecture that allows network (sub)functions to be reused across chains and better utilizes resources, providing capital and operational cost reductions over traditional network functions. In particular, experience has shown that executing network functions as serverless computing instances in the per-flow architecture described above can be cheaper than executing network functions in VMs.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method of processing a network packet, comprising:
   receiving, by a packet manager of one or more serverless computing instances, the network packet;
   determining, by the packet manager, whether to utilize a per-packet basis to process the received network packet or a per-flow basis to process the network packet and a corresponding traffic flow to which the received network packet belongs;
   executing, by the packet manager, the one or more serverless computing instances by sending the network packet to the one or more serverless computing instances that each perform one or more packet processing functions to process the network packet according to the determined basis, wherein each of the one or more serverless computing instances queries a data store separate from the one or more serverless computing instances for at least one of traffic flow state information and packet state information associated with the network packet prior to performing packet processing functions on the network packet, wherein each of the one or more serverless computing instances obtains, from the data store, the at least one of traffic flow state information for processing the network packet on the per-flow basis and packet state information for processing the network packet on the per-packet basis prior to performing packet processing functions on the network packet, and wherein the one or more packet processing functions are performed using the at least one of traffic flow state information and packet state information, wherein executing the one or more serverless computing instances on the per-flow basis includes:
      responsive to determining to process the network packet according to the per-flow basis, launching or re-using, by the packet manager, the one or more serverless computing instances for processing the network packet and the corresponding traffic flow; and
      redirecting, by the packet manager, the received network packet and subsequently received network packets belonging to the traffic flow to the one or more serverless computing instances for processing;
   receiving, by the packet manager, the processed network packet; and
   sending, by the packet manager, the processed network packet to a destination.

2. The method of claim 1, wherein:
   the traffic flow is one of a plurality of sub-flows of an application traffic flow-space; and
   each of the plurality of sub-flows is processed by a respective set of one or more serverless computing instances.

3. The method of claim 1, wherein:
   launching or re-using the one or more serverless computing instances includes transmitting, by the packet manager, one or more requests to execute the one or more serverless computing instances to a serverless computing platform, the one or more requests each including an identifier of the traffic flow; and
   the one or more serverless computing instances each query the data store to obtain the traffic flow state information based on the identifier.

4. The method of claim 1, wherein executing the one or more serverless computing instances on the per-flow basis further includes, responsive to determining, by the packet manager, a lifetime of one of the one or more serverless computing instances is about to expire, launching another serverless computing instances to replace the one of the one or more serverless computing instances.

5. The method of claim 1, wherein executing the one or more serverless computing instances on the per-packet basis includes:
    encapsulating, by the packet manager, the network packet into a request to execute the network packet, the request configured to identify the packet state information associated with the network packet and stored in the data store, and
    responsive to the receiving of the network packet, launching or re-using the one or more serverless computing instances by transmitting, by the packet manager, the request to execute the one or more serverless computing instances for processing the request according to the packet state information.

6. The method of claim 5, wherein the request specifies a predefined workflow of tasks which are performed by the one or more serverless computing instances.

7. The method of claim 5, wherein:
    the receiving the network packet, the executing the one or more serverless computing instances, and the sending the processed network packet, are performed in a private cloud computing system; and
    the packet manager comprises one or more components of a public cloud computing system to which the private cloud computing system is connected, the method further comprising:
        receiving, by the packet manager, another network packet belonging to another traffic flow;
        responsive to determining, by the packet manager, to utilize the per-packet basis to process the other network packet, launching or re-using one or more additional serverless computing instances in the public cloud computing system for the other traffic flow; and
        redirecting, by the packet manager, the other network packet and subsequently received network packets belonging to the other traffic flow to the one or more additional serverless computing instances.

8. The method of claim 1, wherein the receiving the network packet, the executing the one or more serverless computing instances, and the sending the processed network packet, are performed in one of a private cloud computing system, a public cloud computing system, and a hybrid cloud computing system.

9. The method of claim 1, wherein contents of the network packet are stored in and referenced from the data store during the processing of the network packet.

10. One or more non-transitory computer-readable storage media storing one or more programs, which, when executed by a computing system performs operations for processing a network packet, the operations comprising:
    receiving, by a packet manager of one or more serverless computing instances, the network packet;
    determining, by the packet manager, whether to utilize a per-packet basis to process the received network packet or a per-flow basis to process the network packet and a corresponding traffic flow to which the received network packet belongs;
    executing, by the packet manager, the one or more serverless computing instances by sending the network packet to the one or more serverless computing instances that each perform one or more packet processing functions to process the network packet according to the determined basis, wherein each of the one or more serverless computing instances queries a data store separate from the one or more serverless computing instances for at least one of traffic flow state information and packet state information associated with the network packet prior to performing packet processing functions on the network packet, wherein each of the one or more serverless computing instances obtains, from the data store, the at least one of traffic flow state information for processing the network packet on the per-flow basis and packet state information for processing the network packet on the per-packet basis prior to performing packet processing functions on the network packet, and wherein the one or more packet processing functions are performed using the at least one of traffic flow state information and packet state information, wherein executing the one or more serverless computing instances on the per-flow basis includes:
    responsive to determining to process the network packet according to the per-flow basis, launching or re-using, by the packet manager, the one or more serverless computing instances for processing the network packet and the corresponding traffic flow; and
    redirecting, by the packet manager, the received network packet and subsequently received network packets belonging to the traffic flow to the one or more serverless computing instances for processing;
    receiving, by the packet manager, the processed network packet; and
    sending, by the packet manager, the processed network packet to a destination.

11. The one or more non-transitory computer-readable storage media of claim 10, wherein:
    the traffic flow is one of a plurality of sub-flows of an application traffic flow-space; and
    each of the plurality of sub-flows is processed by a respective set of one or more serverless computing instances.

12. The one or more non-transitory computer-readable storage media of claim 10, wherein:
    launching or re-using the one or more serverless computing instances includes transmitting, by the packet manager, one or more requests to execute the one or more serverless computing instances to a serverless computing platform, the one or more requests each including an identifier of the traffic flow; and
    the one or more serverless computing instances each query the data store to obtain the traffic flow state information based on the identifier.

13. The one or more non-transitory computer-readable storage media of claim 10, wherein executing the one or more serverless computing instances on the per-flow basis further includes, responsive to determining, by the packet manager, a lifetime of one of the one or more serverless computing instances is about to expire, launching another serverless computing instances to replace the one of the one or more serverless computing instances.

14. The one or more non-transitory computer-readable storage media of claim 10, wherein executing the one or more serverless computing instances on the per-packet basis includes:
    encapsulating, by the packet manager, the network packet into a request to execute the network packet, the request configured to identify the packet state information associated with the network packet and stored in the data store, and responsive to the receiving of the network packet, launching or re-using the one or more serverless computing instances by transmitting, by the packet manager, the request to execute the one or more serverless computing instances for processing the request according to the packet state information.

15. The one or more non-transitory computer-readable storage media of claim 14, wherein the request specifies a predefined workflow of tasks which are performed by the one or more serverless computing instances.

16. A system, comprising:
one or more processors; and
a memory, wherein the memory includes an application program configured to perform operations for processing a network packet, the operations comprising:
receiving, by a packet manager of one or more serverless computing instances, the network packet;
determining, by the packet manager, whether to utilize a per-packet basis to process the received network packet or a per-flow basis to process the network packet and a corresponding traffic flow to which the received network packet belongs;
executing, by the packet manager, the one or more serverless computing instances by sending the network packet to the one or more serverless computing instances that each perform one or more packet processing functions to process the network packet according to the determined basis, wherein each of the one or more serverless computing instances queries a data store separate from the one or more serverless computing instances for at least one of traffic flow state information and packet state information associated with the network packet prior to performing packet processing functions on the network packet, wherein each of the one or more serverless computing instances obtains, from the data store, the at least one of traffic flow state information for processing the network packet on the per-flow basis and packet state information for processing the network packet on the per-packet basis prior to performing packet processing functions on the network packet, and wherein the one or more packet processing functions are performed using the at least one of traffic flow state information and packet state information, wherein executing the one or more serverless computing instances on the per-flow basis includes:
responsive to determining to process the network packet according to the per-flow basis, launching or re-using, by the packet manager, the one or more serverless computing instances for processing the network packet and the corresponding traffic flow; and
redirecting, by the packet manager, the received network packet and subsequently received network packets belonging to the traffic flow to the one or more serverless computing instances for processing;
receiving, by the packet manager, the processed network packet; and
sending, by the packet manager, the processed network packet to a destination.

* * * * *